Figure 6:
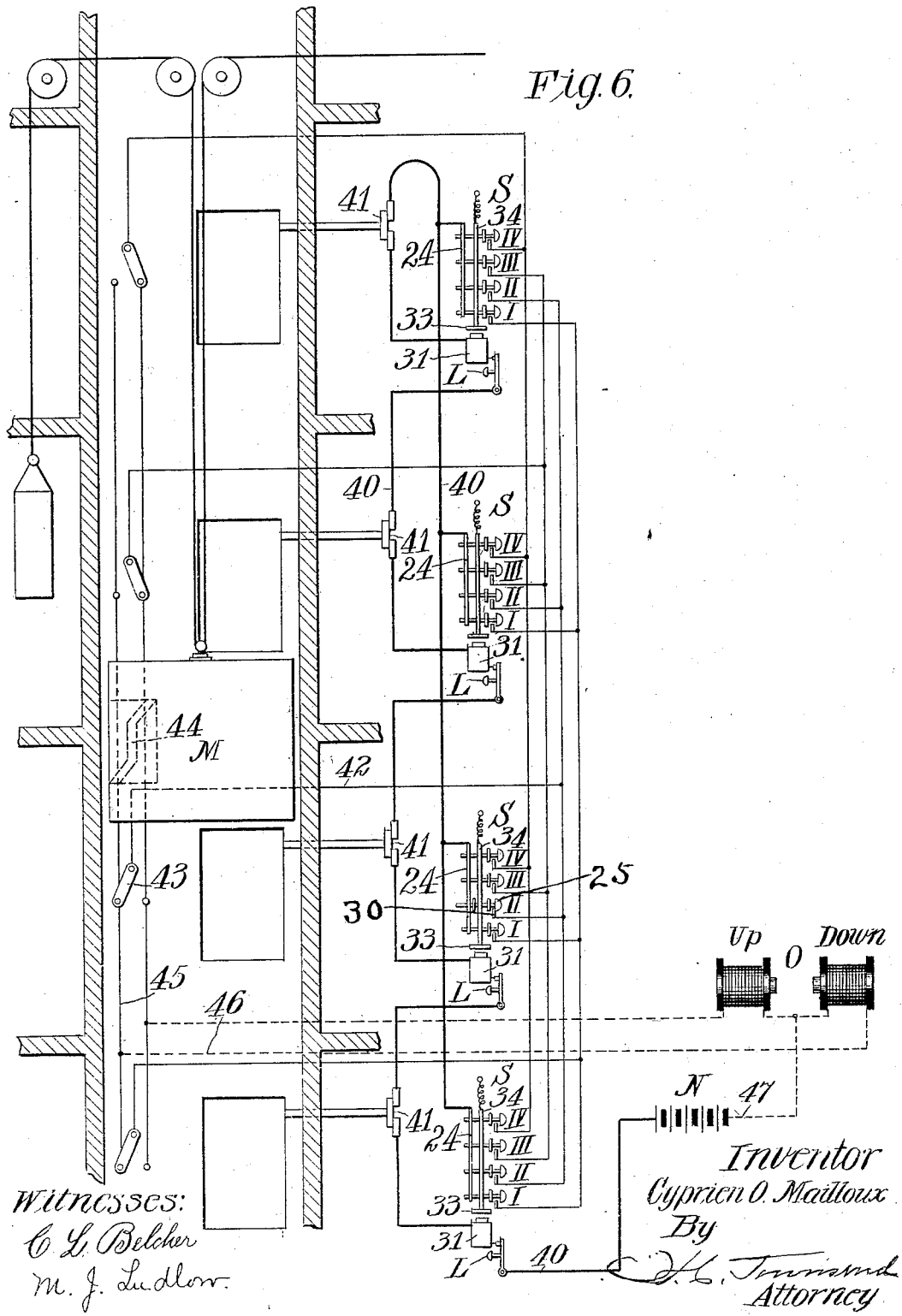

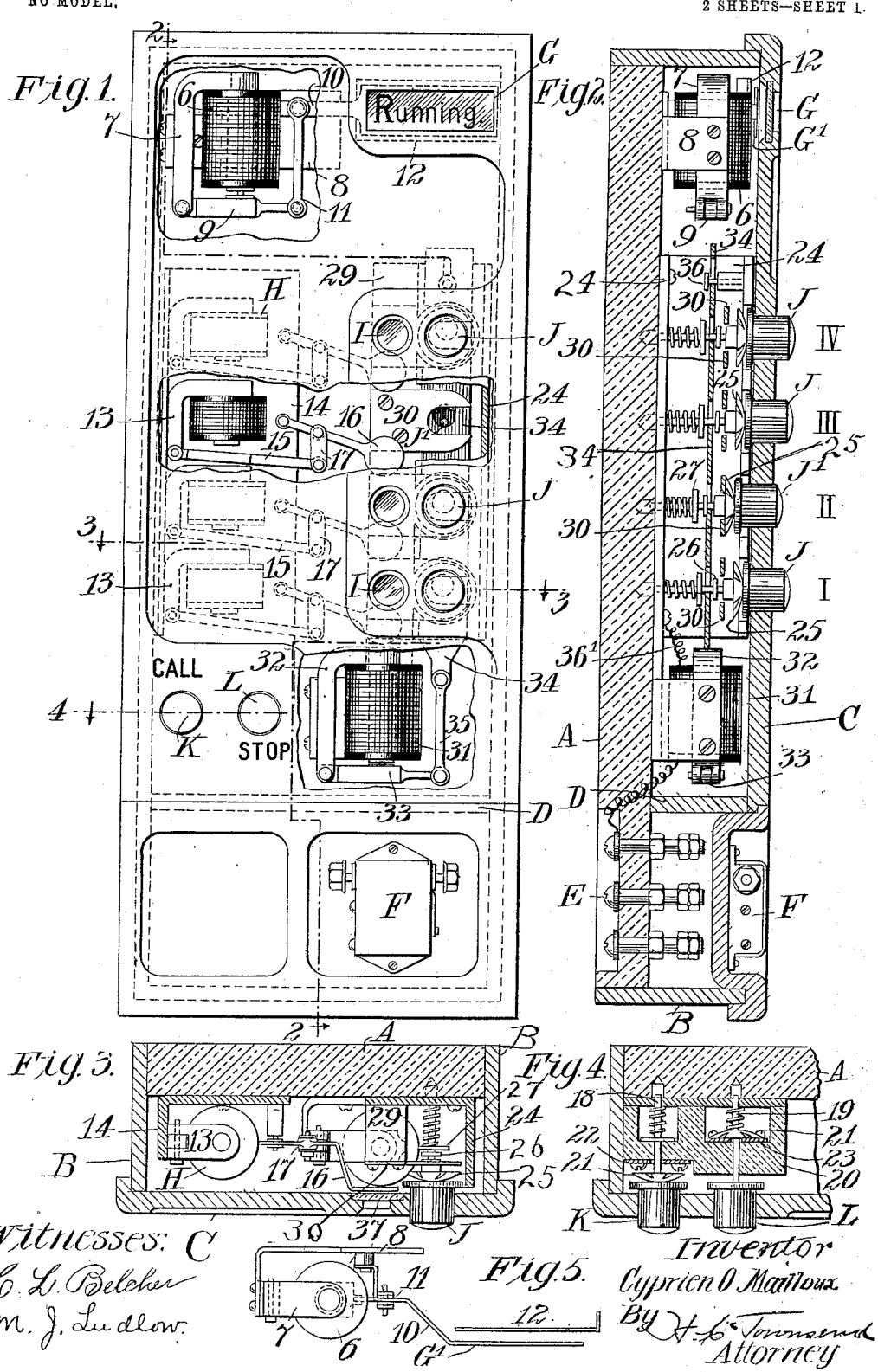

UNITED STATES PATENT OFFICE.

CYPRIEN O. MAILLOUX, OF NEW YORK, N. Y., ASSIGNOR TO OTIS ELEVATOR COMPANY, OF NEW YORK, N. Y., A CORPORATION OF NEW JERSEY.

INDICATING AND CONTROLLING APPARATUS.

SPECIFICATION forming part of Letters Patent No. 725,001, dated April 7, 1903.

Original application filed July 23, 1890, Serial No. 600,235. Divided and this application filed August 8, 1899. Serial No. 726,513. (No model.)

*To all whom it may concern:*

Be it known that I, CYPRIEN O. MAILLOUX, a citizen of the United States, and a resident of New York, in the county of New York and State of New York, have invented a certain new and useful Indicating and Controlling Apparatus, of which the following is a specification.

My invention relates to indicating and controlling apparatus especially designed for use in connection with the operation and management of elevator and other cars, though it may be used in any system of electrical control wherein it is desired to represent at several stations the condition of other stations and to control apparatus at such stations or the transit of a vehicle from one station to another.

The invention as a whole is especially applicable to and intended for use in the system of electrical control for elevator or other cars which forms the subject of a patent granted to me July 30, 1895, under No. 543,495, while some of its features are applicable to my automatic system of electrical control for passenger-elevators patented April 2, 1895, under No. 536,730, and also to any group of two or more push-buttons or switches designed to be self-holding.

The object of the invention is to construct a system and apparatus which will attain the end specified in a simple and effective manner and which will be of easy construction and manipulation.

With these objects and ends in view my invention consists in the construction, combination, and arrangement of parts, substantially as hereinafter specified and claimed.

In the accompanying drawings, which form a part of this specification, Figure 1 represents in face view, with parts broken away, an apparatus embodying my invention in part. Fig. 2 represents a longitudinal section thereof, taken on the broken plane indicated by line 2 2. Fig. 3 represents a transverse section thereof, taken on the plane indicated by the line 3 3, Fig. 1. Fig. 4 represents a transverse section of the portion of the apparatus taken on the plane indicated by the line 4, Fig. 1. Fig. 5 is a plan of one of the parts of said apparatus separated from the case. Fig. 6 is a diagrammatic representation of the system, showing the arrangement of the controlling-switch therein.

In the construction of the controlling and indicating apparatus I use a plate of insulation, preferably slate, upon which are mounted the principal parts of the apparatus and which constitutes the bottom of the case containing said apparatus.

A indicates this base or bottom of the case.

B indicates the walls of the case, and C its cover. The walls and cover are preferably of cast-iron, though they may be of any other suitable material. Across the case near its lower end extends a partition D, on which the cover is divided, the upper portion being provided with apertures or perforations for various push-buttons and with windows or openings for the display of semaphores or indicators. The lower portion of the cover is constructed, as shown, to be readily removable without removing the other portion or opening into the chamber closed thereby and covers the portion of the case devoted to the binding-posts, (indicated at E.) To this cover, and preferably in a depression thereof, as indicated, is mounted an audible signal, which may be a bell or buzzer, the latter being preferred, as illustrated at F, the function of which will be hereinafter described.

In the upper part of the case is located an electromagnetically-operated semaphore or indicator which is displayed at the opening G. Below this and along the right side of the casing are mounted similarly-constructed indicators H, which give their indications through windows I. To the right of these latter indicators is a series of push-buttons J and J'. Below the indicators H is a pair of push-buttons K and L. These indicators and push-buttons just enumerated and the buzzer perform the same offices as the like parts in my patent first above referred to. I have, however, improved upon the construction and operation of these parts, as will hereinafter appear.

The indicator shown at G, which may be termed the "running-indicator," as it is intended to show whether the car is running or not, consists of an electromagnet 6, having a curved pole-piece 7, attached to one end thereof and extending along its side to the other, by which the magnet is mounted upon the upturned edge of the plate 8, and at the lower end of which is hinged the armature 9.

The semaphore G' consists of a plate of thin metal having a curved arm 10, (see Fig. 5,) which is pivoted to the plate 8. This arm is connected to the end of the armature 9 by a link 11. The semaphore G' carries the word "Running" and is presented to the opening G upon the energization of the magnet 6. Back of the semaphore there is rigidly secured to the case in any suitable manner a plate, as 12, on which is the word "Stopped," which is displayed by the dropping of G'.

The magnets controlling the indicators H are mounted in a similar manner to the magnet 6, each being provided with a curved pole-piece 13, secured to the upturned edge of the plate 14 and having an armature 15 hinged to the free end thereof. Semaphore-blades 16 are provided with curved arms, which are pivoted to the plate 14 and connected by links 17 to the armatures 15 in a manner to be moved by the magnets to and from the windows I. The same plate 14 is extended to the lower end of the upper chamber of the case and perforated to receive the stems 18 and 19 of the call and stop buttons K and L. Upon this portion of the plate rests a recessed block of insulation 20, (see Fig. 4,) through which said stems also pass. These buttons are spring-seated, as shown, and each carries a contact 21. The call-button K has its circuit normally open, its contact 21 being out of engagement with a contact-plate 22, mounted upon the block 20. The stop-button L has its circuit normally closed, its contact 21 being normally in engagement with the contact-plate 23, mounted within a recess of said block 20.

The car-controlling switches, which are purposely in the form of push-buttons, (here marked I, II, III, IV,) are mounted in a curved plate 24 and have their stems provided with contacts 25 and projections or collars 26, also with a stop 27 for the upper end of the returning-spring. Upon this plate is located a strip of insulation 29, to which are attached the forked contact-plates 30, with which the contacts 25 engage when the buttons are depressed. Each forked contact-plate 30 is electrically connected to the motor-controlling relay O, as through the conductor 42, switch, as 43, and circuits, as 45 46, (see Fig. 6,) while the push-buttons are connected, as by their springs, to the plate 24, which in turn is connected to the conductor 40, leading to the battery or source of power N. Upon an upturned edge of this plate 24 is mounted the magnet 31 by means of the curved pole-piece 32, which has hinged to its free end the armature 33. This magnet and its armature control a locking device for the car-controlling buttons and operates to make them self-holding. This locking device consists of a plate 34, connected by the link 35 to said armature and guided by the stop 36, located at the upper end of the curved plate 24. The plate 34 is provided with perforations through which pass the stems of the controlling-buttons and which are large enough also for the passage of the collars or projections 26. In the normal position of the lock 34 the perforations therein are in alinement with the collars 26, so that any one of the buttons may be depressed. When the lock is in operation—that is, when the magnet has been energized and attracted its armature, as indicated in the drawings—the aperture has been moved up out of alinement with said openings, so that a button which may have been depressed in the energization of said magnet will be prevented from returning, because of its collar engaging with the edge of the perforation in the plate 34, and all the other buttons will be locked against operation in the same manner; so likewise may all the buttons or switches at the other landings be locked by placing the locking-magnet of the several landings in series.

The parts of the apparatus are in the positions which they take when a car is in transit from one station to another. The button II (Fig. 2, and first floor, Fig. 6) has been depressed, closing the circuit through magnet 31, to plate 24, the stem of the button, the contacts 25 and 30, to the controlling-circuit 36'. This button having been depressed and the car started into operation, the semaphore of magnet 6 is thrown up to indicate that the car is running, as in the patent first above mentioned. The semaphores 16 may be operated when the car is started at any station in any suitable manner—for instance, as set forth in my former patent, No. 543,495.

The stop-button L is used to break the controlling-circuit to stop the car at points between stations when desired. The stopping of the car by this means or upon its arrival at a station acts to break the circuit through magnets 31 and allow the controlling-buttons to return to normal position, all of which is clearly set forth in the first-mentioned patent, wherein each controlling-button has its own individual holding-magnet, while in the present instance the magnet 31 is made to control all the buttons. Another advantage is attained by the use of this magnet—viz., that it renders each box non-interfering in the sense that when one button has been operated none of the others can be until the car has been stopped in one or the other of the ways just mentioned.

I have shown the openings I and G as closed by transparent plates mounted in recesses in the inner side of the cover C, the latter openings being closed by a single plate 37, extending over all of them and secured to the cover by any suitable clips or buttons. (Not shown.)

Other forms of locking devices than that illustrated or other means for securing non-interference at the controlling-switches may be used to accomplish the purpose described, and many changes may be made in the formation and construction of the various parts of the indicators and push-buttons, and they may be adapted to operate upon open or closed circuits, as circumstances may require.

The application of the apparatus above described to a system of control for a car—such, for example, as an elevator car or a lift—is graphically outlined in Fig. 6. Therein the controlling-switches and the locking mechanism for producing non-interference are indicated at each landing of a four-story building at S. On the second landing switch II is shown as closed and the car M is indicated as descending to that landing. The closing of said switch completes circuit from the source of current N, over circuit 40, through each of the stop-buttons L, the locking-switches 31, the circuit-breaking door-switches 41, through the closed switch II at the second landing, then over conductor 42 to floor-switch 43, (in the car-shaft and operable as in the aforesaid patent by the frog 44 on the car,) then over conductors 45 and 46 to the "down" magnet of the starting-relay O, through said magnet and over circuit 47, back to the source of current. Each magnet 31 being thus energized, all the controlling-switches at all the floors are locked and the car left completely to the control of the switch operated. Upon the arrival of the car at the second landing switch 43 will be moved by the frog into middle position, thereby breaking the circuit of the motor-controlling relay O and causing the car to come to rest. Then upon the opening of the landing-door the controlling-circuit will be broken at the door-switch 41. Either of these breaks will interrupt the circuit through magnets 31 and release all the locking-plates, thereby placing the apparatus in such condition that upon closing the door the system will be in condition for sending or calling the car to any other landing, each landing being provided with a switch for operating the controlling-circuit for every other landing.

By the use of the above apparatus and connections complete non-interference in the controlling system is effected at each landing, and the mechanism for effecting it is neatly concentrated and housed, so that to install this system of control it is only necessary to make the connections between the apparatus at the several landings. When installed, the operation of any car-directing switch at any landing throws all the switches at all the landings into a temporary inoperable condition. This obviously may be effected in various ways, and though the one described operates perfectly this invention is not limited in its scope to the special means illustrated. It is obvious also that in a place where it is not desired to send the car from one landing to another the duplicate switches at each landing may be omitted and simply the one controlling-switch for each landing retained. This will in no wise change or disturb the action of the interlocking or non-interference feature of the system, which are now the leading features of this application, though they were originally presented in my application filed July 23, 1896, under Serial No. 600,235.

What I claim as my invention is—

1. The combination with the case provided with a base of insulation and with a cover transversely divided near one end, a partition across the case at said division, binding-posts at one side of the partition, indicating and controlling mechanism at the other side of the partition, a buzzer or audible signal located on the cover over the binding-posts, and push-buttons and semaphore-windows in the other portion of the cover, substantially as shown and described.

2. The combination with the case having a cover provided with windows, of a plate mounted in the case and having an upturned edge, a series of magnets mounted on said edge, a series of semaphores or indicators mounted on said plate, a link at each magnet connecting the armature to its semaphore to throw the semaphore to and from its respective window, and a push-button located in the cover in proximity to each semaphore, as and for the purpose set forth.

3. The combination with a plate having an upturned edge, of an electromagnet, a curved pole-piece connected to one end thereof and to said upturned edge and extended along the side of the magnet to its other end, an armature hinged to the free end of said pole-piece, a semaphore pivoted to said plate and bent outwardly into the plane of the armature, and a link connecting the armature with the semaphore, substantially as shown and described.

4. The combination with an electromagnet, of a series of push-buttons the stem of each of which is provided with a collar or projection, a plate provided with perforations through which said stems and projections may pass, and a magnet for moving said plate into position to prevent the passage of said projections through the perforations thereof.

5. The combination with the case and its cover provided with a row of perforations, of a perforated plate located in the case, spring-seated push-buttons mounted in the perforations of said cover and plate and each provided with a contact, insulated contact-plates mounted in the path of the contacts on the push-buttons, and means for locking all the push-buttons against movement upon the depression of one of them, substantially as set forth.

6. In an electric controlling system for elevator or other cars, the combination with a series of push-buttons or switches at a landing for controlling the movement of a car to and from that landing, an electromagnet in a circuit common to all of said push-buttons, the stem of each button having a catch thereon, a locking-plate connected to the armature of said magnet and operable thereby to hold down the depressed button and to prevent the remaining button or buttons from being depressed until the one depressed is released.

7. In a control device for elevators, the combination with circuit-breakers, of locking devices for the circuit-breakers, the arrangement being such that when one of the circuit-breakers is operated the locking device prevents the operation of the others.

8. In a control device for elevators, the combination with the circuit-breakers, of locking devices for the circuit-breakers, and a magnet in the circuit for operating the locking devices, the arrangement being such that when one of the circuit-breakers is operated the locking device prevents the operation of the others.

9. In a control device for elevators, the combination with the circuit-breakers, of an electrically-operated locking device for the circuit-breakers, the arrangement being such that when one of the circuit-breakers is closed the locking device prevents the other from being closed.

10. In a control device for elevators, the combination with the circuit-breakers, of an electrically-controlled locking device for the circuit-breakers, and a magnet in the circuit for operating the locking device.

11. In a control device for elevators, the combination with the circuit-breakers, of an electrically-controlled locking device therefor, and a magnet in the circuit for operating the locking device, the arrangement being such that when one of the circuit-breakers is energized it will be locked in that position and the operation of the others prevented as long as the circuit remains closed.

12. The combination in an elevator-controller system, of a plurality of circuit-closers, a locking device for each circuit-closer and means for simultaneously moving the several locking devices, whereby the locking devices when moved lock one of the circuit-closers for closure and lock the other circuit-closers against closure.

13. The combination in an elevator-controlling circuit, of a closing device for each landing, a locking device for each circuit-closer, and means actuated by the closing of one circuit-closer to lock it closed and to lock the others against closure.

14. The combination in an elevator-controlling circuit, of circuit-closers for each landing, and electrically-actuated locking devices for each circuit-closer, the locking devices being included in the same circuit and so arranged that when one of the circuit-closers is locked the others will be rendered inoperative.

15. The combination in an elevator-controlling circuit, of a circuit-closer for each landing, and a separate electrically-actuated locking device for each circuit-closer, so arranged that each locking device engages its corresponding circuit-closer and locks it against closure.

16. The combination in an elevator-controlling circuit, of a circuit-closer for each landing, and an electrically-actuated locking device for each circuit-closer, so arranged that each locking device engages its corresponding circuit-closer to lock it in position to maintain the circuit.

17. In a controlling system for elevator or other cars, the combination with a car-controlling switch or push-button at each landing, of means at each landing for locking the switch or push-button when operated, and for locking it against operation when the switch or button at any of the other landings is operated.

18. In a controlling system for elevator or other cars, the combination with car-controlling switches or push-buttons at each landing for calling the car to that landing, of a locking mechanism at each landing for providing non-interference between all of said switches by holding the operated switch inoperative, and at the same time holding the other switches against operation.

19. In an electric controlling system for elevator or other cars, the combination of a controlling-switch or push-button at each landing normally open and adapted on operation to close circuit for the purpose of bringing the car to the landing, a lock at each landing adapted to hold said switch or push-button at either an open or closed position, and operating or controlling magnets, one at each landing, whereby on the operation of any switch or button at any landing the same may be locked in position to close circuit and the switches or buttons at all other landings may be locked in open-circuit position.

20. In an electric controlling system for elevator or other cars, the combination with controlling-switches at the landings, of locking mechanism at each switch, and means actuated by any one of the switches for locking all the others.

21. In an electric controlling system for elevator or other cars, the combination with the controlling-circuit, door-switches located therein, controlling-switches for ordering the movements of the car, and locking mechanism for the controlling-switches located in the controlling-circuit, as and for the purpose set forth.

22. In a controlling system for elevator or other cars, the combination with car-controlling switches or push-buttons at each landing for calling the car to that landing and directing it to any other landing, of a locking mechanism at each landing for providing non-interference between all of said switches by holding the operated switch inoperative and at the same time holding the other switches against operation.

23. In a controlling system for elevator or other cars, the combination with the controlling-switch at each landing for actuating the driving mechanism to bring the car to that landing, of duplicate switches at each landing corresponding to the controlling-switches at other landings whereby the car may from one landing be directed to any of the others, and means at each landing actuated by any one of the switches operated at a landing, for producing non-interference between all of said switches, substantially as set forth.

24. In an electric controlling system for elevator or other cars, the combination with a series of push-buttons or switches at each landing for controlling the movement of the car to and from that landing, of an electromagnet at each landing in a circuit common to the several series of switches at the various landings, and means controlled by such magnet for locking all of the switches at its respective landing.

25. In an electric controlling system for elevator or other cars, the combination with circuits controlling the operation of the car-actuating mechanism, of a series of switches in said circuits at a landing for controlling the movement of a car to and from that landing, an electromagnet in a circuit common to said switches, and means controlled thereby for locking all of said switches upon the operation of any one of them.

26. In an electric controlling system for elevator or other cars, the combination with circuits controlling the operation of the car-actuating mechanism, a series of switches at a landing operating respectively upon said circuits by which the car is caused to move to other landings, of an electromagnet in a circuit common to said switches, and means controlled thereby for locking all of said switches upon the operation of any one of them.

27. In a controlling system for elevator or other cars, the combination with a series of switches or push-buttons located at a landing and a corresponding series of circuits for controlling the movement of the car and leading respectively to the corresponding switches at the other landings, an electromagnet in a common connection to said switches or buttons at the various landings, and a lock or catch controlled thereby and adapted to lock any one of said switches or buttons in operated position, and means for releasing the same when the car reaches the landing to which it is directed.

28. In a controlling system for elevator or other cars, non-interference magnets one at each landing placed in series in a circuit leading to the several landings, in combination with branches from said circuit one at each landing containing means whereby the magnets at all the other landings may be thrown out of operation.

29. In an electric controlling system for elevator and other cars, the combination with the car-controlling apparatus at each landing, of a magnet for rendering the same inoperative and means at every other landing for governing the action of said magnet.

30. In an electric controlling system for elevator and other cars, the combination with the car-controlling apparatus at each landing, of a magnet for rendering the same inoperative, and means at another landing for governing the action of said magnet.

31. In a controlling system for elevator and other cars, the combination with a car-controlling circuit at each landing, of a magnet at each landing for keeping said circuit open thereat during the closure of a like circuit at another landing, and means at the latter for governing the action of said magnet.

32. In a controlling system for elevator and other cars, a controlling-circuit branched through controlling-switches, one at each landing, magnetically-controlled means at each landing for keeping the branch thereat open during the closure of a branch at another landing, and means at the latter for governing the action of the magnet.

33. In a controlling system for elevator and other cars, the combination with the controlling-circuit at each landing, of a magnet at each landing for keeping said circuit open at the landing during the movement of the car while controlled from another point, and means governed by the car for throwing said magnet out of operation.

34. In a controlling system for elevator or other cars, the combination with a number of controlling-switches at each landing one for calling the car to said landing, the others for sending it elsewhere, of non-interference magnets one at each landing in a circuit common to said switches, and a circuit-controller operated by the car and governing the circuit of said magnets.

35. The combination with two circuit-breakers at each landing controlling the motor of an elevator to effect the up and down movements of the cage, of a locking device to lock both the shifted and unshifted circuit-breaker in position, an electromagnet for moving the locking device, and conductors arranged to excite said magnet on the moving of either circuit-breaker, substantially as described.

36. The combination in a device for controlling elevator-cages from different landings, of a motor, conductors, cage and two circuit-breakers at each landing, controlling the up and down circuits through said conductors, and a locking device at each landing constructed to lock in position both the circuit-breakers whether one of them has been shifted or not, an electromagnet for moving each locking device, and circuit connections whereby all the magnets are excited and the locking devices shifted on the movement of any one of the circuit-breakers, substantially as described.

37. The combination with two circuit-breakers at each landing controlling the motor of an elevator to effect the up and down movements of the cage, of a locking device for locking all the circuit-breakers in position after the shifting of any one of the same, an electromagnet for shifting said device, and a circuit-breaker for breaking the circuit including the said electromagnet, substantially as described.

38. The combination with the series of circuit-breakers and series of electrically-actuated locking devices for locking the same in position on the shifting of any one of the circuit-breakers to close a circuit to move the car, of means at each landing to shift the locking device thereof and break the said actuating-circuit to stop the car at said landing, substantially as described.

39. The combination of a casing, circuit-breakers, and means for shifting the same from without the casing, a locking-plate, an electromagnet for operating the same, the parts constructed to lock both circuit-breakers in any position which they occupy when the plate is shifted by the magnet, and means for restoring the parts to position when the magnet-circuit is broken, substantially as described.

40. In an electric controlling system for elevator or other cars, the combination with a switch or push-button in a controlling-circuit, of an electromagnetically-controlled catch for locking the switch or button in the operated position, means actuated by the operation of the switch or button for holding said catch in a fixed position during the movement of the car, and means for releasing it when the car reaches its destination.

41. In a controlling system for elevator or other cars, the combination with a car-controlling switch or push-button at each landing for calling the car to that landing, of a locking mechanism at each landing for providing for non-interference between all of said switches by holding the operated switch in operated position and at the same time holding the other switches against operation, substantially as described.

42. In an electric controlling system for elevator or other cars, the combination with circuits controlling the operation of the car-actuating mechanism, of a series of switches in said circuits at the landings for controlling the movement of a car to the corresponding landings, an electromagnet in a circuit common to said switches and means controlled thereby for locking all of said switches upon the operation of any one of them, substantially as described.

43. In an electric controlling system for elevator or other cars, the combination with circuits controlling the operation of the car-actuating mechanism, of a series of switches at the landings operating respectively upon said circuits by which the car is caused to move to the corresponding landing, an electromagnet in a circuit common to said switches and means controlled thereby for locking all of said switches upon the operation of any one of them, substantially as described.

44. The combination of an electric circuit, a plurality of circuit-closing devices in branches of the electric circuit, a locking-magnet in connection with each circuit-closing device, mechanical connections between the magnet-armature and the connected circuit-closing device whereby attraction of the magnet-armature without simultaneous closure of the connected circuit-closing device will lock the latter in open position, and connections whereby all the magnets are in circuit with all the circuit-closing devices, substantially as described.

45. In an elevator system, the combination of a controlling-circuit, a circuit-closing device, a locking-magnet in circuit therewith, mechanical connections between the magnet-armature and the circuit-closing device whereby actuation of the magnet-armature will lock the circuit-closing device in either open or closed position, and means operated by the elevator mechanism for opening the controlling-circuit when the mechanism reaches a certain position, substantially as described.

46. In an elevator system the combination of a controlling-circuit, circuit-closing devices in branches of the controlling-circuit and located at the several elevator-landings, a locking-magnet in connection with each circuit-closing device, mechanical connections between the magnet-armature and the connected circuit-closing device whereby attraction of the magnet-armature without simultaneous closure of the connected circuit-closing device will lock the latter in open position, connections whereby all the magnets are in circuit with all the circuit-closing devices, floor-limit switches in each branch of the controlling-circuit in series with the circuit-closing devices, and means operated by the elevator mechanism for opening the floor-limit switches in each branch when the elevator is opposite the landing at which the circuit-closing device in the same branch is located, substantially as described.

47. The combination in an elevator-controlling circuit, of circuit-closers for each landing, and electrically-actuated locking devices for each circuit-closer, the locking devices being included in the same circuit and so arranged that when one of the circuit-closers is locked the others will be rendered inoperative, substantially as described.

48. The combination in an elevator-controlling circuit, of a circuit-closer for each landing, and a separate electrically-actuated locking device for each circuit-closer, so arranged that each locking device engages its corresponding circuit-closer and locks it against closure, substantially as described.

49. The combination in an elevator-controlling circuit, of a circuit-closer for each landing and an electrically-actuated locking device for each circuit-closer, so arranged that each locking device engages its corresponding circuit-closer to lock it in position to maintain the circuit, substantially as described.

50. In a controlling system for elevator or other cars, the combination with a series of switches or push-buttons located at a landing and a corresponding series of circuits for controlling the movement of the car and leading respectively to the corresponding switches at the other landings, an electromagnet in a common connection to said switches or buttons at the various landings, and a lock or catch controlled thereby and adapted to lock any one of said switches or buttons in operative position, and means for releasing the same when the car reaches the landing to which it is directed, substantially as described.

51. The combination with the magnet and its support, of the pivoted armature, a locking-plate hinged to said armature, guided by the magnet-support and provided with an aperture therein, and a spring-seated push-button stem provided with a collar adapted to pass through said aperture when the plate is in its normal position, substantially as described.

52. The combination with the up and down branches of the controlling-circuit, of floor-switches operated by the car and to all of which said circuits are connected, and car-controlling switches, substantially as described.

53. In a controlling system for elevator or other cars, the combination with the controlling switch or push-button at a landing and an automatic floor-switch in the circuit thereof, of an automatic catch or lock for holding the switch or button in the depressed or circuit-closing position when operated to bring the car to the same landing, and a magnet in the circuit of said push-button and floor-switch whereby the push-button may assume open-circuit position when the car reaches the landing, substantially as described.

54. In a controlling system for elevator or other cars, the combination with a series of switches or push-buttons located at a landing and a corresponding series of controlling-circuits leading respectively to other landings and through automatic floor-switches thereat, an electromagnet in the common connection to said switches or push-buttons, and a lock or a catch controlled thereby and adapted to lock any one of said buttons in depressed or circuit-closing position and to release the same upon the operation of the said floor-switch at the landing to which the car is directed, substantially as described.

Signed at New York, in the county of New York and State of New York, this 4th day of August, A. D. 1899.

CYPRIEN O. MAILLOUX.

Witnesses:
DELBERT H. DECKER,
M. J. LUDLOW.